US008475284B1

(12) United States Patent
Rudi et al.

(10) Patent No.: US 8,475,284 B1
(45) Date of Patent: Jul. 2, 2013

(54) DYNAMIC VIEWS WITHIN GAMING ENVIRONMENTS

(76) Inventors: Scott Rudi, Aliso Viejo, CA (US); Anthony Nguyen, Lakewood, CA (US)

(*) Notice: Subject to any disclaimer, the term of this patent is extended or adjusted under 35 U.S.C. 154(b) by 0 days.

(21) Appl. No.: 13/563,677

(22) Filed: Jul. 31, 2012

(51) Int. Cl.
A63F 9/24 (2006.01)

(52) U.S. Cl.
USPC .......................................................... 463/42

(58) Field of Classification Search
USPC .......................................................... 463/42
See application file for complete search history.

(56) References Cited

U.S. PATENT DOCUMENTS

| | | | |
|---|---|---|---|
| 5,384,910 A | 1/1995 | Torres | |
| 6,374,336 B1 | 4/2002 | Peters et al. | |
| 6,466,275 B1 | 10/2002 | Honey et al. | |
| 6,629,129 B1 | 9/2003 | Bookspan et al. | |
| 6,699,127 B1 | 3/2004 | Lobb et al. | |
| 6,864,886 B1 | 3/2005 | Cavallaro et al. | |
| 7,390,254 B2 | 6/2008 | Hirai | |
| 7,917,632 B2 | 3/2011 | Lee et al. | |
| 7,970,820 B1 | 6/2011 | Sivasubramanian et al. | |
| 8,128,503 B1 | 3/2012 | Haot et al. | |
| 2004/0087363 A1 | 5/2004 | Bogenn | |
| 2004/0116183 A1 | 6/2004 | Prindle | |
| 2004/0153569 A1 | 8/2004 | Savathphoune | |
| 2004/0248631 A1 | 12/2004 | Hirai | |
| 2006/0098013 A1 | 5/2006 | Wong et al. | |
| 2007/0117617 A1 | 5/2007 | Spanton et al. | |
| 2007/0250901 A1 | 10/2007 | McIntire et al. | |
| 2007/0256030 A1 | 11/2007 | Bedingfield | |
| 2009/0083662 A1 | 3/2009 | Fitzmaurice et al. | |
| 2009/0118017 A1 | 5/2009 | Perlman et al. | |
| 2009/0118018 A1 | 5/2009 | Perlman et al. | |
| 2009/0118019 A1 | 5/2009 | Perlman et al. | |
| 2009/0118020 A1 | 5/2009 | Koivisto et al. | |
| 2009/0124387 A1 | 5/2009 | Perlman et al. | |
| 2009/0172171 A1 | 7/2009 | Amir | |
| 2009/0208181 A1 | 8/2009 | Cottrell | |
| 2009/0215531 A1 | 8/2009 | Perlman et al. | |
| 2009/0215540 A1 | 8/2009 | Perlman et al. | |
| 2009/0290753 A1 | 11/2009 | Liu et al. | |
| 2009/0297118 A1 | 12/2009 | Fink et al. | |
| 2009/0326970 A1 | 12/2009 | Estrada et al. | |
| 2010/0154050 A1 | 6/2010 | Mukkara et al. | |
| 2010/0167809 A1 | 7/2010 | Perlman et al. | |
| 2010/0167816 A1 | 7/2010 | Perlman et al. | |
| 2010/0169964 A1 | 7/2010 | Liu et al. | |
| 2011/0013087 A1 | 1/2011 | House et al. | |
| 2011/0093600 A1 | 4/2011 | Lee et al. | |
| 2011/0105226 A1 | 5/2011 | Perlman | |
| 2011/0111854 A1 | 5/2011 | Roberts et al. | |
| 2011/0151971 A1 | 6/2011 | Altshuler et al. | |

(Continued)

OTHER PUBLICATIONS

Extended European Search Report with mail date of Jan. 8, 2013, re European Application No. 12170200.5 filed May 31, 2012.

(Continued)

Primary Examiner — Omkar Deodhar

(57) ABSTRACT

Systems and methods for providing dynamic views for video game programs are provided herein. Exemplary methods for providing a dynamic view of a gaming environment may include continually calculating a bounding area of a gaming environment, the bounding area being defined by locations of a plurality of players relative to one another within the gaming environment, the bounding area changing as the plurality of players move relative to one another, as well as continually generating a top down view of the bounding area of the gaming environment, the top down view being dynamically altered as the bounding area is dynamically adjusted.

20 Claims, 6 Drawing Sheets

U.S. PATENT DOCUMENTS

| | | |
|---|---|---|
| 2011/0161666 A1 | 6/2011 | Gladwin et al. |
| 2011/0238618 A1 | 9/2011 | Valdiserri et al. |
| 2012/0142433 A1 | 6/2012 | Perlman et al. |
| 2012/0149476 A1 | 6/2012 | Perlman et al. |
| 2012/0151346 A1 | 6/2012 | McClements, IV |
| 2012/0151347 A1 | 6/2012 | McClements, IV |
| 2012/0204107 A1 | 8/2012 | Salinas |
| 2012/0311624 A1 | 12/2012 | Oskolkov et al. |

OTHER PUBLICATIONS

International Search Report mailed Feb. 21, 2013 in application no. PCT/US2012/20007, filed Jan. 12, 2012.

Rytych, "Game-like environments for nuclear engineering education using GECK", 1st International Nuclear & Renewable Energy Conference (INREC), pp. 1-5, IEEE, Mar. 2010.

DYNAMIC VIEWS WITHIN GAMING ENVIRONMENTS

FIELD OF THE INVENTION

The present technology relates generally to videogames and gaming environments, and more specifically, but not by way of limitation, to videogames and gaming environments that provide dynamic views of gaming environments, such as dynamically adjustable top down views that focus allow end users to focus on actions or activity between selected players.

BACKGROUND

Video game programs are often configured to provide various views of a gaming environment. Generally described, the gaming environment is a virtual world, playing field, arena, or other location where end users (e.g., players) interact with one another and virtual objects included in the gaming environment. The view that is generated for an end user typically includes a representation of the portion of the virtual world in which the player is currently located. What is needed are dynamic views of the gaming environment that include top down views of a gaming environment that are bounded by player location and where proximity between players is used to dynamically adjust a zoom for the top down view. These views may be advantageously used by broadcasters, spectators, referees, participants, and or other end users. Rather than having to track selected players manually, the present technology allows for end users to specify the players that they would like to track as well as receive dynamic top down views of the selected players as they operate within the gaming environment.

SUMMARY OF THE INVENTION

According to some embodiments, the present technology may be directed to methods for providing a dynamic view of a gaming environment. The methods may comprise: (a) continually calculating a bounding area of a gaming environment, the bounding area being defined by locations of a plurality of players relative to one another within the gaming environment, the bounding area changing as the plurality of players move relative to one another; and (b) continually generating a top down view of the bounding area of the gaming environment, the top down view being dynamically altered as the bounding area is dynamically adjusted.

According to other embodiments, the present technology may be directed to methods for providing a dynamic view of a gaming environment. These methods may comprise: (a) determining a plurality of players within the gaming environment for the dynamic view; (b) continually tracking locations of the plurality of players; (c) continually calculating distances between the plurality of players relative to one another; and (d) continually generating a top down view that includes the plurality of players, a zoom of the top down view being automatically adjusted based upon the calculated distances.

According to additional embodiments, the present technology may be directed to systems that provide a dynamic view of a gaming environment. The systems may comprise: (a) a memory for storing executable instructions; and (b) a processor for executing the instructions to control a graphics processor, wherein execution of the instructions causes the graphics processor to: (i) continually calculate a bounding area of a gaming environment, the bounding area being defined by locations of a plurality of players relative to one another within the gaming environment, the bounding area changing as the plurality of players move relative to one another; and (ii) continually generating a top down view of the bounding area of the gaming environment, the top down view being dynamically altered as the bounding area is dynamically adjusted.

DETAILED DESCRIPTION OF EXEMPLARY EMBODIMENTS

Figure 1:
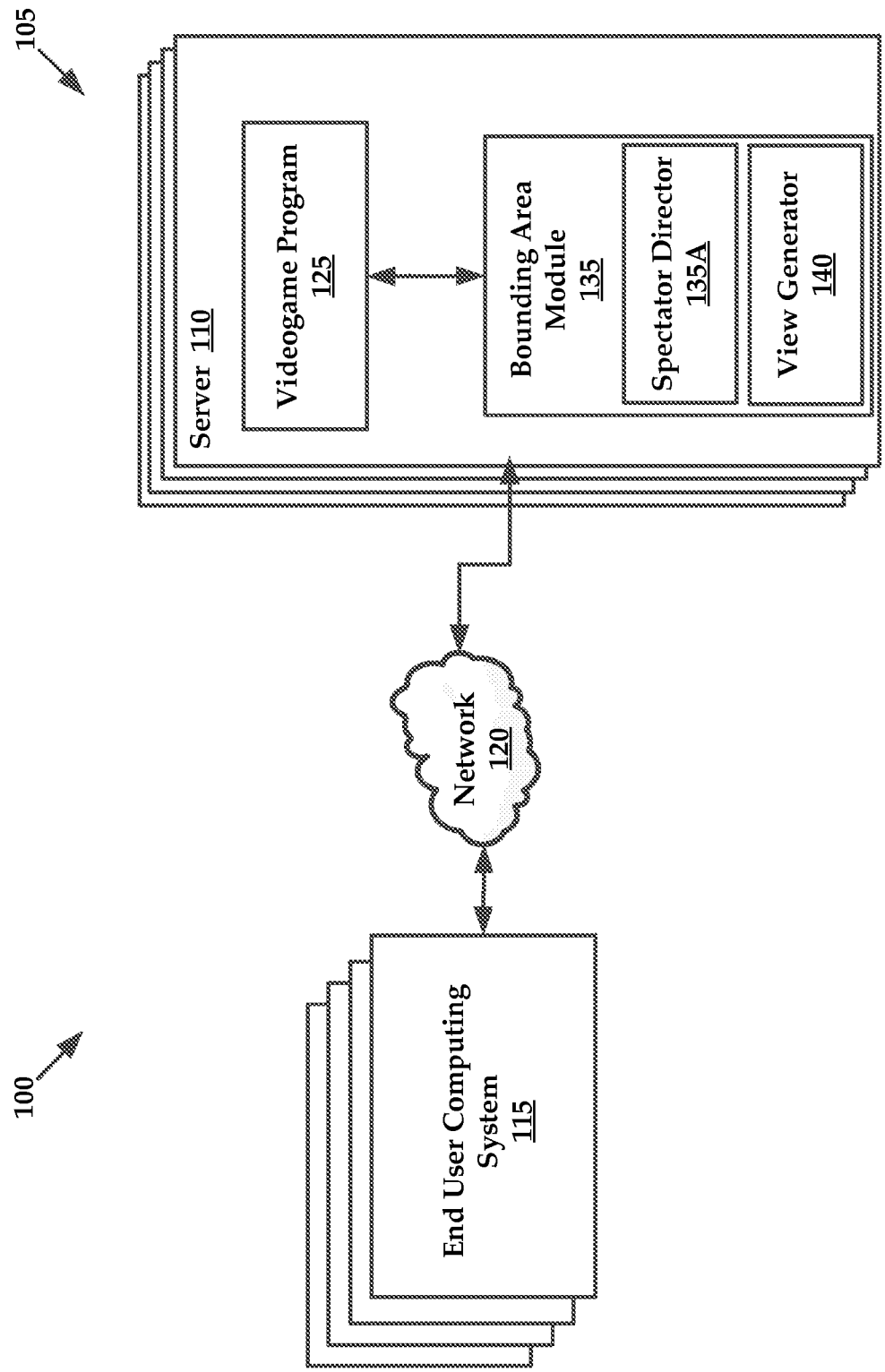
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

According to some embodiments, the present technology may be directed to systems and methods that generate and provide dynamic views of a gaming environment. It will be understood that in some instances, the gaming environment and associated dynamic views may be generated by a networked gaming system that provides a videogame program. More specifically, but not by limitation, the present technology may generate unique camera views for a video game. These views may comprise top down views of the entire game map (e.g., gaming environment). The view is dynamic in that it automatically adjusts by zooming in and out and panning to follow a plurality of selected players within the game. The dynamic view may be altered over time such that the selected players are in view and the camera view may be maximized.

In some instances, the present technology may calculate a bounding area from the locations of the selected players. Using the bounding area, the present technology may zoom in and/or out to focus on the action surrounding those selected players. The distances between the plurality of players may be used as the basis for selectively adjusting the zoom and/or pan of the view. As the selected players near each other the zoom of the overhead camera may increase. When players move apart, the zoom of the camera may automatically decrease. Furthermore, in some instances, the aspect ratio of the view may be altered and/or the field of view may be widened to encompass the selected players.

The present technology may calculate or determine a center of the zoom. This center of zoom may be controlled by the locations of selected players within the bounding area. In some instances the center of zoom may be determined by a weighted center of mass calculation, taking into account how close selected players are to each other and "clumping" of players (e.g., groups of players in close proximity to one another).

End users may be allowed to select players that are to be included in the bounding area calculation. In some instances, the end users may utilize a graphical user interface that provides a list of selectable players that may be added into the bounding area calculation. In other instances, end users may select players by dragging a box or other shape around one or more players. According to some embodiments, the present technology may exclude players from the bounding calculation if it is determined that a selected player is inactive, such as when a player is away from the keyboard or the end user computing system associated with the active player loses communicative coupling with the networked gaming system. These and other advantages of the present technology will be discussed in greater detail herein.

FIG. 1 illustrates an exemplary architecture 100 for practicing aspects of the present technology. The architecture 100 is shown as including a networked gaming system 105 implemented within the context of a server 110 (shown within a plurality of web servers). The networked gaming system 105 may facilitate the operation of a videogame program 125 that generates a gaming environment where participants (e.g., game players) interact with an environment, other participants, characters, and other objects that would be known to one of ordinary skill in the art.

An end user computing system 115 (shown within a plurality of end user computing systems) may be communicatively coupled to the server 110 via a network connection 120. It will be understood that the network connection 120 may include any private or public network such as the Internet. End user computing system 115 may comprise, for example, a personal computer or a gaming console.

When the end user computing system 115 is communicatively coupled to the server 110, participants may interact with the gaming environment generated by the video game program 125 that executes on the networked gaming system 105.

In some embodiments, the networked gaming system 105 may be implemented as a cloud-based computing environment. In general, a cloud-based computing environment is a resource that combines the computational power of a large grouping of processors and/or that combines the storage capacity of a large grouping of computer memories or storage devices. For example, systems that provide a cloud resource may be utilized exclusively by their owners. These systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user. With respect to the present disclosure, the workloads provided by the multiple users of the present technology would include game play in the networked gaming environment.

According to some embodiments, the networked gaming system 105 may be generally described as a particular purpose computing environment that includes executable instructions stored in memory. These instructions, when executed by the processor provide dynamic views within the gaming environment. More specifically, the networked gaming system 105 may execute the videogame program 125 to generate a gaming environment.

With regard to the videogame program 125, the videogame program 125 may comprise any type of videogame application/program/set of executable instructions, including but not limited to, a multiplayer networked videogame such as a sporting event, a MMORPG (massively multiplayer online role-playing game), a first-person shooter, a strategy game, role playing games, action games, arcade games, simulation games, and so forth. Other suitable types of videogames that would be known to one of ordinary skill in the art are also likewise contemplated for use in accordance with the present technology. Active participants (e.g., game players) may interact with the gaming environment that is generated by the videogame program 125. For example, participants in team sporting events, such as baseball, football, basketball, and so forth, may interact as a team. Individual competitors may also compete one on one with other participants in sporting event such as tennis, boxing, and so forth.

According to some embodiments, the networked gaming system 105 may be configured to provide dynamic views of a gaming environment. The networked gaming system 105 may provide these dynamic views by continually calculating a bounding area of a gaming environment. It will be understood that the bounding area may be defined by locations of a plurality of players relative to one another within the gaming environment. The bounding area may change over time as the plurality of players move relative to one another within the gaming environment.

In some instances, the networked gaming system 105 may continually generate a top down view of the bounding area of the gaming environment. Advantageously, the top down view may be dynamically altered as the bounding area is dynamically adjusted.

According to other embodiments, the networked gaming system 105 may provide dynamic views of a gaming environment by determining a plurality of players within the gaming environment for the dynamic view. Again, players may be selected by an end user such as a spectator, observer, broadcaster, referee, participant, and so forth. In some embodiments, the networked gaming system 105 may continually track locations of the plurality of players and calculate distances between the plurality of players relative to one another.

Using the location and distance data, the networked gaming system 105 may continually generate a top down view that includes the plurality of players, a zoom of the top down view being automatically adjusted based upon the calculated distances.

According to other embodiments, the present technology may be implemented as a networked gaming system 105 that provides a videogame program 125 that includes dynamic views. That is, the networked gaming system 105 may be configured to provide dynamic views of a gaming environment generated by execution of the videogame program 125. The networked gaming system 105 may determine a plurality of players within the gaming environment for the dynamic view. Additionally, the networked gaming system 105 may continually (or periodically) track locations of the plurality of players and calculate distances between the plurality of players relative to one another. Using the locations and distances, the networked gaming system 105 may continually generate a top down view that includes the plurality of players. In some instances, the networked gaming system 105 may automatically adjust a zoom for the top down view based upon the calculated distances.

More specifically, the videogame program 125 may comprise a bounding area module 135 and a view generator 140. In other embodiments, the bounding area module 135 and a view generator 140 may cooperate together as a standalone plug-in or module that is separate from the videogame program 125, but executable by the networked gaming system 105. It is noteworthy that the server 110 of the networked gaming system 105 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionalities.

During game play, an end user may request a dynamic view of a gaming environment, such as the gaming environment of FIG. 3, which will be described in greater detail below. The end user may transmit their request from their end user computing system 115, through the network 120 to the networked gaming system 105. This request may include, for example, an input received by the end user computing system 115 such as a keystroke, a plurality of keystrokes, a mouse click, a gesture, a motion-based input, and so forth.

In some instances, end users may select players which are to be included in the dynamic view. For example, end users may be able to click on selectable players that are present in the gaming environment (e.g., avatars), choose player names from a list, draw a peripheral bounding around a plurality of players, and so forth.

In other instances, the networked gaming system 105 may automatically select the plurality of players based upon activity levels. For example, if a plurality of players are currently engaged in combat with one another, the networked gaming system 105 may be configured to automatically select the players for inclusion into the view.

Once the players for the dynamic view have been selected, the bounding area module 135 may be executed to continually (or periodically and according to a predetermined schedule) calculate a bounding area of a gaming environment. More specifically, the bounding area being may be calculated by determining locations of the plurality of players relative to one another within the gaming environment. As the plurality of players traverse through the gaming environment, the bounding area may selectively change.

Figure 2A:
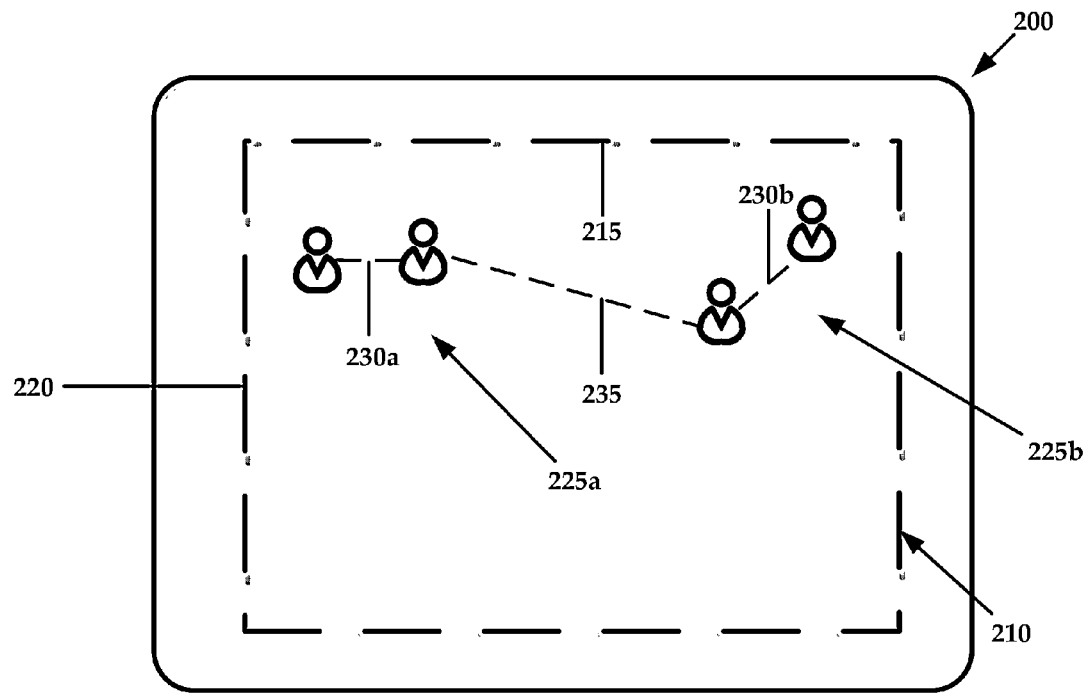
FIG. 2A illustrates an exemplary bounding area calculation.
Figure 2B:
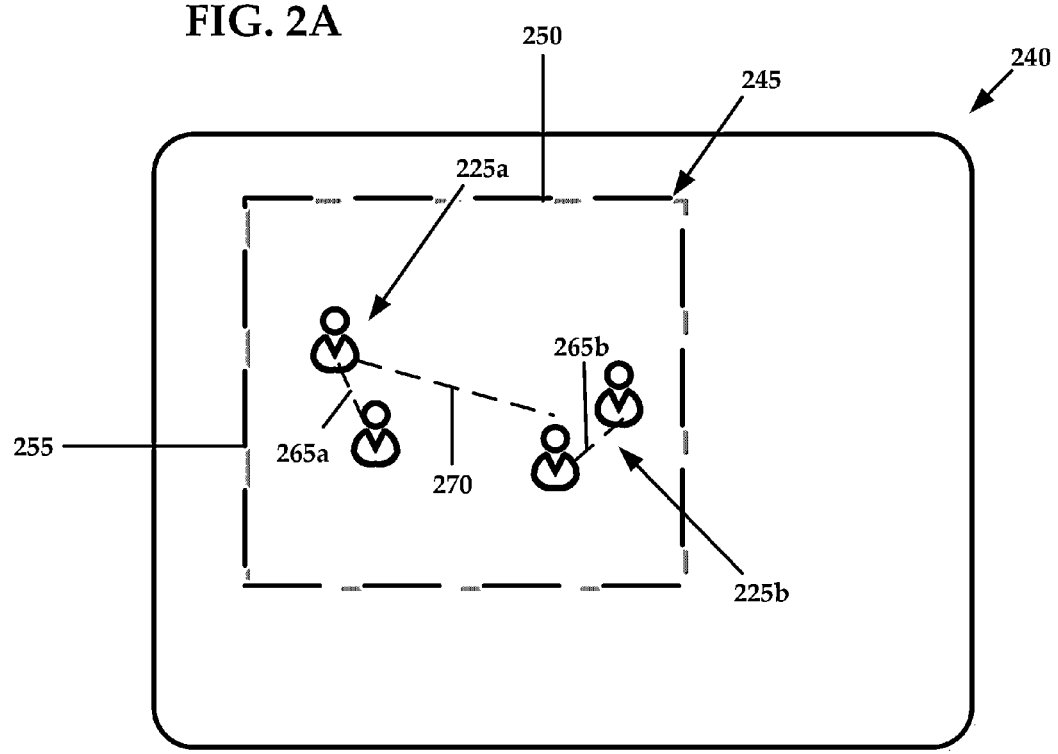
FIG. 2B illustrates another exemplary bounding area calculation that is subsequent in time to the bounding area calculation shown in FIG. 2A.

FIGS. 2A and 2B collectively illustrate multiple calculations of a bounding area as players move through a gaming environment. FIG. 2A comprises a gaming environment 200. Although not shown, the gaming environment 200 will be understood to comprise the various objects rendered by execution of the videogame program 125, such as landscape, avatars, structures, and so forth. An exemplary view of a gaming environment is shown in FIG. 3.

A bounding area 210 may comprise a width component 215 and a height component 220. Again, the size and/or shape of the bounding area 210 may be selectively adjusted to ensure that the plurality of players are included in the bounding area 210. For example, the plurality of players may comprise player group 225a and player group 225b.

Generally speaking, the bounding area module 135 may calculate a bounding area value for the bounding area 210 by multiplying the width component 215 and the height component 220 together. By way of non-limiting example, if the width component 215 is ten and the height component 220 is eight, the bounding area value would be eighty. Units may or may not be utilized. The initial zoom value for the dynamic view may be established using the initial bounding area value of eighty. Thus, changes in the bounding area value may be utilized as the basis for the view generator 140 to automatically adjust the zoom and/or panning for the dynamic view.

In some instances, the view generator 140 may select a zoom value for the dynamic view based only upon the bounding area value. Thus, the bounding area value may be correlated to a zoom value. The view generator 140 may utilize a table of zoom values that are associated with bounding area values.

The bounding area module 135 may track the locations each of the plurality of players that are assigned to the dynamic view. For example, the bounding area module 135 may track the Cartesian coordinates (e.g. X and Y positions) of each of the players relative to the gaming environment 200.

Additionally, distances between the plurality of players may be utilized as a basis for the view generator 140 to dynamically adjust the zoom of the dynamic view. For example, the bounding area module 135 may calculate a distance 230a between the players of player group 225a, a distance 230b between the players of player group 225b, as well as a distance 235 between player group 225a and player group 225b. It will be understood that the bounding area module 135 may calculate the distances between various players and groups of players other than those described.

FIG. 2B comprises the same gaming environment 240 as the gaming environment 200 of FIG. 2A. Differently from FIG. 2A, FIG. 2B comprises a bounding area 245 that is smaller in size relative to the bounding area 205 of FIG. 2A. The bounding area 245 may comprise a bounding width component 250 with a value of six and a length component 255 with a value of four. The calculated bounding area value for the bounding area 245 is twenty four.

Thus, a decrease in the bounding area value from eighty to twenty four may cause the view generator 140 to increase the zoom for the dynamic view because the bounding area decreased in size.

With regard to FIG. 2B, the bounding area module 135 may again calculate a distance 265a between the players of player group 225a, a distance 265b between the players of player group 225b, as well as a distance 270 between player group 225a and player group 225b. In comparison, the distance 270 between player group 225a and player group 225b in FIG. 2B has decreased relative to the distance 235 between player group 225a and player group 225b of FIG. 2A. Using a time delta value (e.g., time between bounding area calculations), a velocity for each of the player groups may be calculated, as well as a closing distance or convergence time.

These velocity values may also be used by the view generator 140 to adjust the zoom for the dynamic view. For example, if it is determined that the plurality of players are rapidly approaching one another or converging on a particular area, the zoom may be adjusted by the view generator 140 more quickly than if the plurality of players are moving at a more moderate pace.

In some instances, the view generator 140 may utilize a bounding area delta to determine how quickly the zoom should be adjusted. Using the example above, the bounding area delta would be fifty six, which is the difference between the initial bounding area value and the later bounding area value. The bounding area delta value may also be compared to a time delta (e.g., change in time between bounding value calculations). If the magnitude of the bounding area delta is relatively large and the time delta is relatively short (e.g., seconds or fractions of second), the view generator 140 may more quickly adjust the zoom for the dynamic view.

In sum, the zoom of the dynamic view may be automatically adjusted by the view generator 140 based upon any of bounding area size, change in bounding area size, change in bounding area size over time, velocity of players or player groups, or any combinations thereof.

Generally speaking, the view generator 140 may continually generate a top down view of the bounding area of the gaming environment. As described in greater detail above, the top down view may be dynamically altered as the bounding area is dynamically or continually adjusted.

In accordance with the present technology, while the above-described examples contemplate the use of a rectangle shaped bounding area, one of ordinary skill in the art will appreciate that bounding areas of varying sizes may also likewise be utilized in accordance with the present technology. For example, the bounding area module 135 may draw an irregularly shaped bounding area that encompasses the plurality of players. Such irregularly shaped bounding areas may require more complex algorithms to calculate the area. In other instances, the bounding area may comprise predefined polygon shapes such as triangles, squares, circles, and so forth.

According to some embodiments, the bounding area module 135 may be executed to determine a center of mass for the bounding area that may be utilized as a center point for zooming in and out on a dynamic view. For example, if a plurality of players in a group are congregated in a relatively small area and other players are distributed about bounding area, the center of mass for the bounding area may be located more closely to the plurality of players that are congregated into a group.

The bounding area module 135 may determine the center of mass for the bounding area using center of mass equations that determine a weighted average location of all the mass in a body, such as the bounding area. Exemplary equations for determining a center of mass comprise, but are not limited to:

$$R=(1/M)\Sigma m_i r_i$$

which is used to calculate the center of mass R of a system of particles, which is a total mass M defined as the average of their positions, $r_i$, weighted by their masses, $m_i$. Other center of mass equations may also likewise be utilized in accordance with the present technology. Additionally, the bounding area module 135 may calculate a center of mass for the bounding area by performing a virtual plumb line method. A virtual mass value may be assigned to each player for performing the aforementioned calculation. One of ordinary skill in the art will appreciate that weight values are commonly assigned to players as a part of their player profile.

Once the center of mass for the bounding area has been calculated, the bounding area module 135 may use the center of mass to determine values such as angular momentum and moment of inertia for players, which may be utilized in more complex analyses for calculating not only the automatic adjustment of zoom for the view, but also pan for the dynamic view.

Thus, the view generator 140 may dynamically adjust both the zoom and pan for a dynamic view. The pan for a dynamic view may be dynamically adjusted by the view generator 140 based upon any of the center of mass for the bounding area (e.g., which may be used to determine a vertical axis for panning), velocities of players, the zoom, and so forth. Other factors which may be utilized to affect panning of the dynamic view that would be known to one of ordinary skill in the art may also likewise be utilized in accordance with the present technology. In some instances, panning of the dynamic view may be selectable by the end user.

According to some embodiments, the bounding area module 135 may remove a player from the bounding area calculation if the player is determined to be inactive. For example, if the bounding area module 135 determines that the velocity of a player is zero for a predetermined period of time, such as twenty seconds, the bounding area module 135 may remove the player from future bounding area calculations. In other instances, if the communicative coupling between the end user computing system 115 utilized by the end user associated with a player in the bounding area is interrupted, the bounding area module 135 may remove the player from future bounding area calculations. Removing inactive players from the continuous bounding calculations performed by the bounding area module 135 may reduce the likelihood that the dynamic view that is generated from the bounding area calculation by the view generator 140 will incorporate inactive players, which may cause the bounding area to be enlarged desirously. That is, it is advantageous for the dynamic view that is generated by the view generator 140 to focus on active participants. Thus, if the bounding area is errantly enlarged by including inactive players, the dynamic view may tend to zoom out away from the active participants as they move away from the inactive players. These errors may lead to undesirable views that are not zoomed in on the active participants of interest.

According to some embodiments, the networked gaming system 105 may select many groups of players and create many dynamic views. For example, the networked gaming system 105 may create dynamic views for marquis groupings of players. End users can watch these marquis groupings by viewing different dynamic views. In some instances, the networked gaming system 105 may provide several panes of dynamic views that can be arranged, for example, as a grid of dynamic views. Thus, an end user may simultaneously watch a plurality of dynamic views.

Figure 3:
FIG. 3 is an exemplary dynamic top-down view of players within a bounding area.

FIG. 3 is an exemplary dynamic top-down view 300 of a gaming environment 305. The zoom for the view is based upon a bounding area 310, which is represented by a rectangle shown in phantom. The line that delineates the bounding area 310 is preferably transparent or not shown to the end user. Portions of a first team of players 315 are displayed on a list disposed on the one side of the view 300, while a second team of players 320 is displayed on a list which is disposed on the opposing side of the view 300.

Generally, the bounding area 310 includes selected players from the first and second teams 315 and 320, respectively. In this exemplary view, players "BoySpitter," "LilacBiter," "TheDude," "Bolo," "MonkeyFocus," "SuppleYogurt," and "KnuckleJuice" are included in the bounding area 310. It is noteworthy that because the players are shown in a top down orientation, it is advantageous to assign each player an icon. The icon is displayed proximate the player such that when multiple players are included in the bounding area 310, they may be visually distinguishable from one another. The players are listed in the respective player lists along with their icons for easy reference.

A selected player, such as SuppleYogurt 325, when highlighted, is identified in a details box 330. The details box 330 may provide various types of statistical information about a selected player, such as the team to which the player belongs, an icon associated with the player, as well as other game related data such as health 335 and ammunition 340.

The view 300 may also comprise recent activity information 345. For example, the recent activity information 345 for the first team of players 315 includes information that player "SuppleYogurt" killed both player "BluthBanana" (not shown) and "Bolo" utilizing a plasma cannon weapon for both kills.

Figure 4:
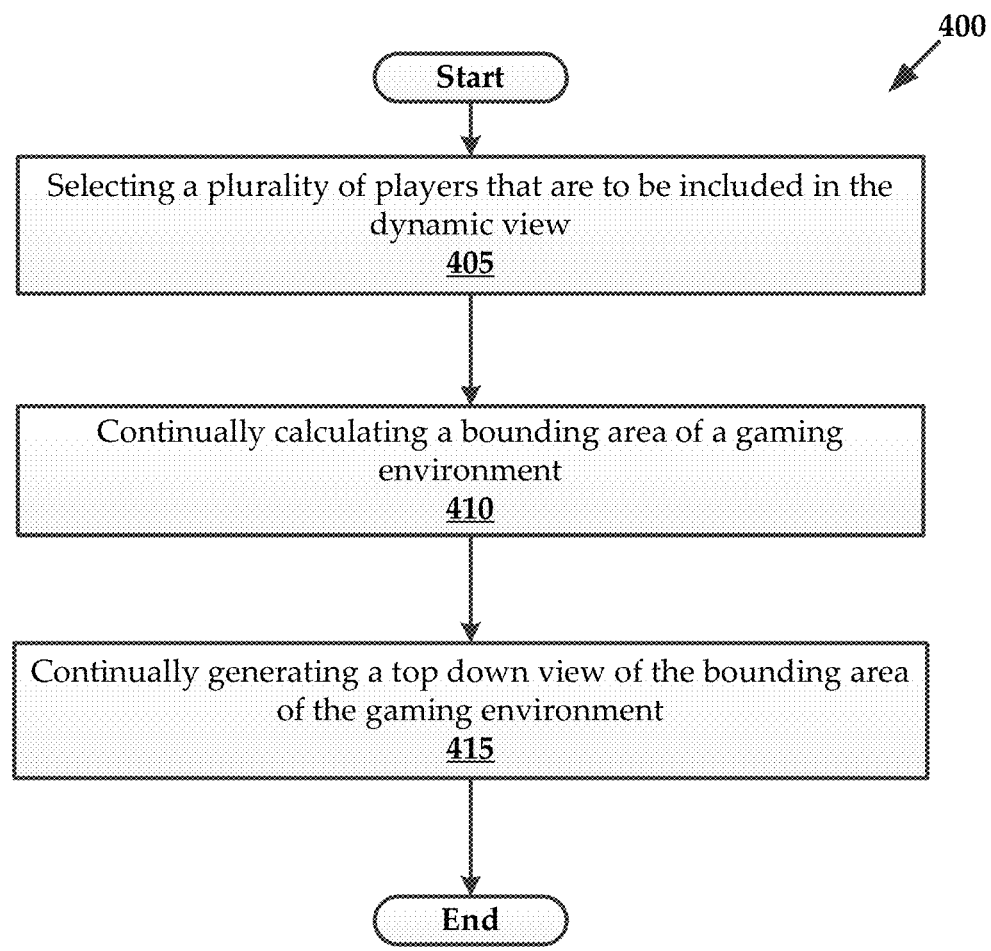
FIG. 4 is a flowchart of an exemplary method for providing a dynamic view of a gaming environment.

FIG. 4 is a flowchart of an exemplary method 400 for providing a dynamic view of a gaming environment. The method 400 may comprise a step 405 of selecting a plurality of players that are to be included in the dynamic view. Next, the method 400 may comprise a step 410 of continually calculating a bounding area of a gaming environment. Again, the bounding area may be defined by locations of a plurality of players relative to one another within the gaming environment. In accordance with the present disclosure, the bounding area may change as the plurality of players move relative to one another.

Next, the method 400 may comprise a step 415 of continually generating a top down view of the bounding area of the gaming environment. As mentioned above, the top down view may be dynamically altered as the bounding area is dynamically adjusted by continual calculation of the bounding area.

Figure 5:
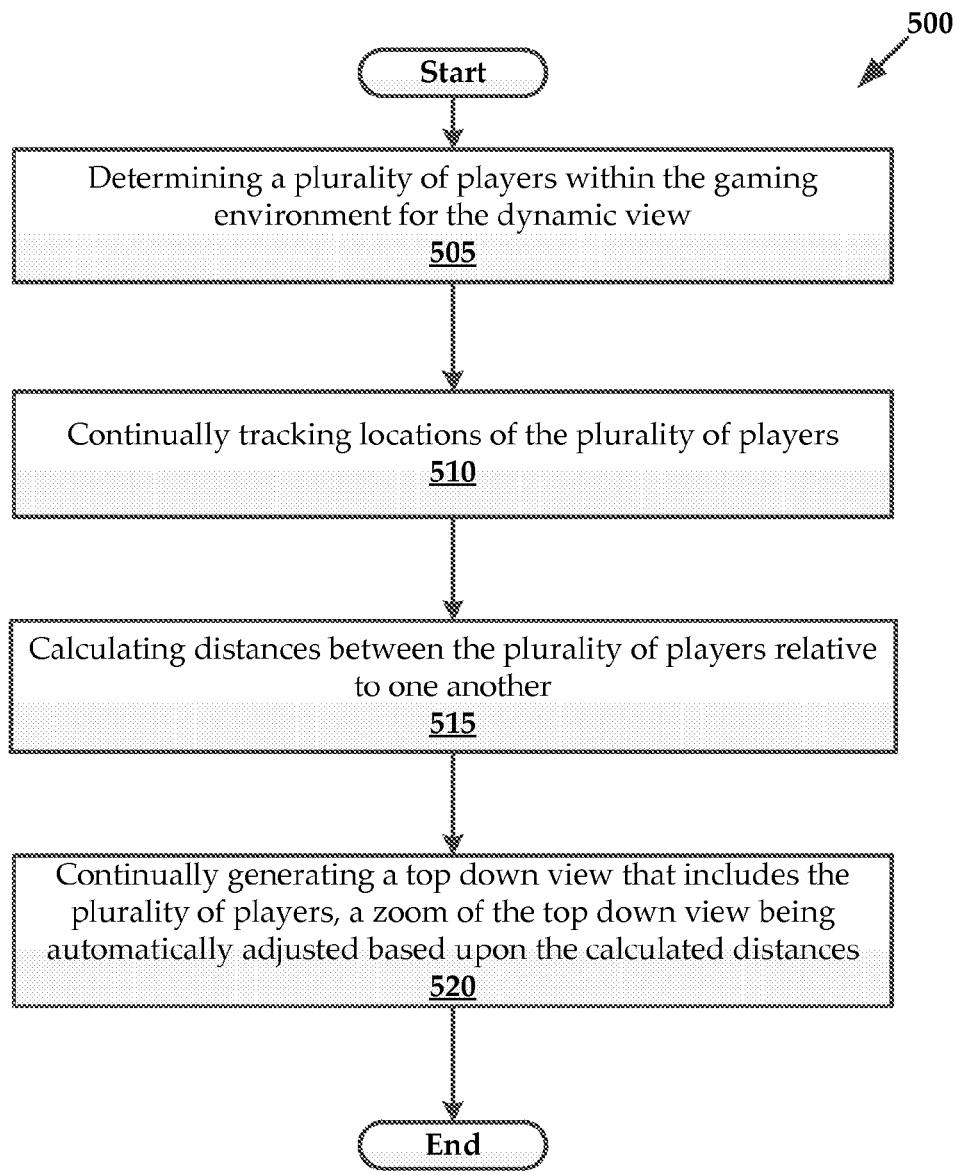
FIG. 5 is a flowchart of another exemplary method for providing a dynamic view of a gaming environment.

FIG. 5 is a flowchart of an exemplary method 500 for providing a dynamic view of a gaming environment. The method 500 may comprise a step 505 of determining a plurality of players within the gaming environment for the dynamic view. As has been described above, the players may be selected by end users who may be able to click on selectable players that are present in the gaming environment (e.g., avatars), choose player names from a list, draw a peripheral bounding around a plurality of players, and so forth.

Next, the method 500 may comprise a step 510 of continually tracking locations of the plurality of players, as well as a step 515 of calculating distances between the plurality of players relative to one another. Additionally, the method 500 may comprise a step 520 of continually generating a top down view that includes the plurality of players, a zoom of the top down view being automatically adjusted based upon the calculated distances.

Figure 6:
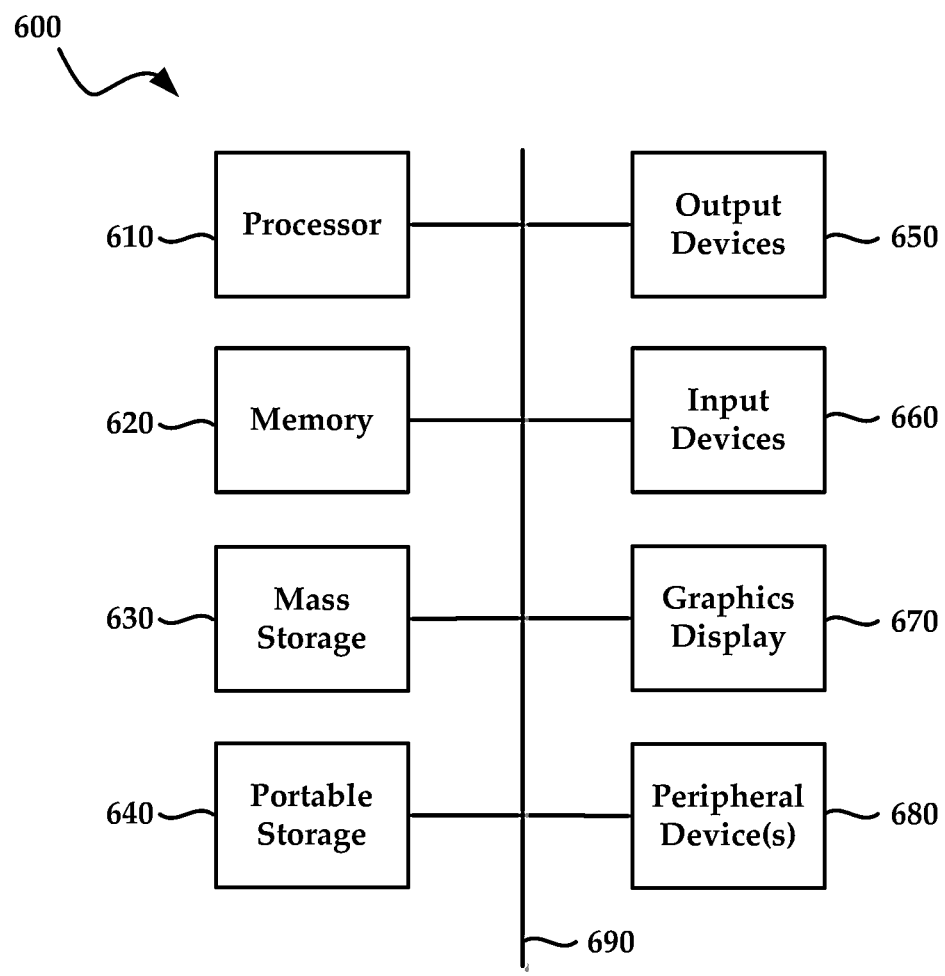
FIG. 6 is a block diagram of an exemplary computing system that may be utilized to practice aspects of the present disclosure.

FIG. 6 illustrates an exemplary computing system 600 that may be used to implement an embodiment of the present technology. Either of the end user computing system 115 and/or the server 110 may include one or more of the components of computing system 600. The computing system 600 of FIG. 6 includes one or more processors 610 and memory 620. Memory 620 stores, in part, instructions and data for execution by the one or more processors 610. Memory 620 can store the executable code when the system 600 is in operation. The computing system 600 of FIG. 6 may further include a mass storage device 630, portable storage medium drive(s) 640, output devices 650, user input devices 660, a graphics display 670, and other peripheral device(s) 680.

The components shown in FIG. 6 are depicted as being connected via a single bus 690. The components may be connected through one or more data transport means. The one or more processor 610 and memory 620 may be connected via a local microprocessor bus, and the mass storage device 630, peripheral device(s) 680, portable storage medium drive(s) 640, and graphics display 670 may be connected via one or more input/output (I/O) buses.

Mass storage device 630, which may be implemented with a magnetic disk drive or an optical disk drive, is a non-volatile storage device for storing data and instructions for use by processor 610. Mass storage device 630 can store the system software for implementing embodiments of the present technology for purposes of loading that software into memory 620.

Portable storage medium drive(s) 640 operate in conjunction with a portable non-volatile storage medium, such as a floppy disk, compact disk or digital video disc, to input and output data and code to and from the computing system 600 of FIG. 6. The system software for implementing embodiments of the present technology may be stored on such a portable medium and input to the computing system 600 via the portable storage medium drive(s) 640.

Input devices 660 provide a portion of a user interface. Input devices 660 may include an alphanumeric keypad, such as a keyboard, for inputting alphanumeric and other information, or a pointing device, such as a mouse, a trackball, stylus, or cursor direction keys. Additionally, the computing system 600 as shown in FIG. 6 includes output devices 650. Suitable output devices include speakers, printers, network interfaces, and monitors.

Graphics display 670 may include a liquid crystal display (LCD) or other suitable display device. Graphics display 670 receives textual and graphical information, and processes the information for output to the display device.

Peripheral device(s) 680 may include any type of computer support device to add additional functionality to the computing system. Peripheral device(s) 680 may include a modem or a router.

The components contained in the computing system 600 of FIG. 6 are those typically found in computing systems that may be suitable for use with embodiments of the present technology and are intended to represent a broad category of such computer components that are well known in the art. Thus, the computing system 600 of FIG. 6 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing a dynamic view of a gaming environment, the method comprising:
    continually calculating a bounding area of a gaming environment, the bounding area being defined by locations of a plurality of players relative to one another within the gaming environment, the bounding area changing as the plurality of players move relative to one another; and
    continually generating a top down view of the bounding area of the gaming environment, the top down view being dynamically altered as the bounding area is dynamically adjusted.

2. The method according to claim 1, further comprising receiving selections of the plurality of players.

3. The method according to claim 2, wherein selecting the plurality of players comprises determining players included in a selected area of interest received from an end user.

4. The method according to claim 1, further comprising dynamically adjusting a zoom for the top down view.

5. The method according to claim 4, further comprising continually calculating a center of zoom for the top down view by determining a center of mass based upon the locations of the plurality of players as well as proximity between the plurality of players.

6. The method according to claim 5, wherein the top down view is further dynamically altered based upon the center of zoom.

7. The method according to claim 4, wherein dynamically adjusting the zoom for the top down view comprises increasing the zoom when a distance between at least a portion of the plurality of players decreases and decreasing the zoom when a distance between at least a portion of the plurality of players increases.

8. The method according to claim 1, further comprising selectively adjusting a pan of the top down view based upon the dynamic adjustment of the bounding area.

9. The method according to claim 4, further comprising selectively adjusting a pan of the top down view based upon the dynamic adjustment of the zoom.

10. The method according to claim 1, further comprising removing a player from the bounding area if the player is determined to be inactive.

11. A system for providing a dynamic view of a gaming environment, the system comprising:
    a memory for storing executable instructions; and
    a processor for executing the instructions, the instructions comprising:
        a bounding area module that continually calculates a bounding area of a gaming environment, the bounding area being defined by locations of a plurality of players relative to one another within the gaming environment, the bounding area changing as the plurality of players move relative to one another; and
        a view generator that continually generates a top down view of the bounding area of the gaming environment, the top down view being dynamically altered as the bounding area is dynamically adjusted.

12. The system according to claim 11, wherein the bounding area module receives selections of the plurality of players.

13. The system according to claim 11, wherein the bounding area module determines locations of the plurality of players included in a selected area of interest received from an end user.

14. The system according to claim 11, wherein the view generator dynamically adjusts a zoom for the top down view.

15. The system according to claim 14, wherein the view generator continually calculates a center of zoom for the top down view by determining a center of mass based upon the locations of the plurality of players as well as proximity between the plurality of players.

16. The system according to claim 15, wherein the view generator further dynamically alters the top down view based upon the center of zoom.

17. The system according to claim 14, wherein the view generator dynamically adjusts the zoom for the top down view by increasing the zoom when a distance between at least a portion of the plurality of players decreases and decreasing the zoom when a distance between at least a portion of the plurality of players increases.

18. The system according to claim 11, wherein the view generator selectively adjusts a pan of the top down view based upon the dynamic adjustment of the bounding area.

19. The system according to claim 14, wherein the view generator selectively adjusts a pan of the top down view based upon the dynamic adjustment of the zoom.

20. A method for providing a dynamic view of a gaming environment, the method comprising:
    determining a plurality of players within the gaming environment for the dynamic view;
    continually tracking locations of the plurality of players;
    continually calculating distances between the plurality of players relative to one another; and
    continually generating a top down view that includes the plurality of players, a zoom of the top down view being automatically adjusted based upon the calculated distances.

* * * * *

UNITED STATES PATENT AND TRADEMARK OFFICE
CERTIFICATE OF CORRECTION

PATENT NO.         : 8,475,284 B1
APPLICATION NO.    : 13/563677
DATED              : July 2, 2013
INVENTOR(S)        : Scott Rudi et al.

Page 1 of 1

It is certified that error appears in the above-identified patent and that said Letters Patent is hereby corrected as shown below:

Title page, Item (73) Assignee should be listed as follows:

-- Red 5 Studios, Inc., Laguna Hills, CA (US) --

Signed and Sealed this
Fifteenth Day of October, 2013

Teresa Stanek Rea
*Deputy Director of the United States Patent and Trademark Office*